(12) United States Patent
Van Lunteren

(10) Patent No.: US 10,372,358 B2
(45) Date of Patent: *Aug. 6, 2019

(54) ACCESS PROCESSOR

(71) Applicant: International Business Machines Corporation, Armonk, NY (US)

(72) Inventor: Jan Van Lunteren, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 321 days.

This patent is subject to a terminal disclaimer.

(21) Appl. No.: 14/941,837

(22) Filed: Nov. 16, 2015

(65) Prior Publication Data

US 2017/0139629 A1    May 18, 2017

(51) Int. Cl.
*G06F 3/06* (2006.01)
*G06F 12/06* (2006.01)
*G06F 12/02* (2006.01)

(52) U.S. Cl.
CPC .......... *G06F 3/0629* (2013.01); *G06F 3/0604* (2013.01); *G06F 3/0644* (2013.01); *G06F 3/0673* (2013.01); *G06F 12/0292* (2013.01); *G06F 12/0607* (2013.01); *G06F 2212/1012* (2013.01)

(58) Field of Classification Search
None
See application file for complete search history.

(56) References Cited

U.S. PATENT DOCUMENTS

| 6,073,154 | A | * | 6/2000 | Dick | G06F 17/141 |
| | | | | | 708/401 |
| 6,272,592 | B1 | * | 8/2001 | Seznec | G06F 12/0864 |
| | | | | | 711/118 |
| 7,701,251 | B1 | | 4/2010 | Rahman et al. | |
| 7,902,879 | B2 | | 3/2011 | Ozguz et al. | |

(Continued)

OTHER PUBLICATIONS

Memory-Driven Near-Data Acceleration; by Jan van Lunteren; IBM Sep. 2014 (Year: 2014).*

(Continued)

*Primary Examiner* — Reginald G Bragdon
*Assistant Examiner* — Paul M Knight
(74) *Attorney, Agent, or Firm* — Cantor Colburn LLP; Daniel Morris

(57) ABSTRACT

A reconfigurable computing device having a plurality of reconfigurable partitions and that is adapted to perform parallel processing of operand data by the partitions is provided. The computing system includes a memory device that is adapted to store configuration data to configure the partitions of the computing device, to store operand data to be processed by the configured partitions and to store processing results of the operand data. A programmable memory access processor having a predefined program is provided. The access processor performs address generation, address mapping and access scheduling for retrieving the configuration data from the memory unit, for retrieving the operand data from the memory unit and for storing the processing results in the memory unit. The access processor also transfers the configuration data from the memory unit to the computing device and transfers the operand data from the memory unit to the computing device.

20 Claims, 12 Drawing Sheets

(56) References Cited

U.S. PATENT DOCUMENTS

| | | | |
|---|---|---|---|
| 8,456,880 B2 | 6/2013 | Norman | |
| 9,794,343 B2 | 10/2017 | Hebert et al. | |
| 2003/0149962 A1* | 8/2003 | Willis | G06F 17/5027 717/135 |
| 2005/0278680 A1* | 12/2005 | Mukherjee | G06F 17/5054 716/105 |
| 2009/0031104 A1 | 1/2009 | Vorbach et al. | |
| 2014/0176187 A1 | 6/2014 | Jayasena et al. | |
| 2016/0098505 A1* | 4/2016 | Larzul | G06F 17/5027 703/15 |
| 2016/0314025 A1 | 10/2016 | McGarry et al. | |

OTHER PUBLICATIONS

Design Methodology for a Modular Service-Driven Network Processor Architecture; Gabrani; IBM Zurich Research Laboratory (Year : 2002).*
Designing a Programmable Wire-Speed Regular-Expression Matching Accelerator; van Lunteren; IBM Research—Zurich, Switzerland; IEEE 2012 (Year: 2012).*
Configuration Compression for FPGA based Embedded Systems by Dandalis 2001 (Year: 2001).*
Periodic Real-Time Scheduling for FPGA Computers Danne 2005 (Year: 2005).*
Reconfiguration and CommunicationAware Task Scheduling by Huang 2010 (Year: 2010).*
TransitionAware Task Scheduling and Configuration Selection by Kooti 2013 (Year: 2013).*
Power Consumption Measurement and Configuration Time of FPGA by Lawal (Year: 2015).*
Operating Systems for Reconfigurable Embbedded Platforms by Steiger 2004 (Year: 2004).*
Accelerating Calculations on the RASC Platform by Wielgosz 2009 (Year: 2009).*
Improved Delay Measurement Method in FPGA based on Tranistion Probability by Wong 2011 (Year: 2011).*
List of IBM Patents or Patent Applications Treated As Related; Date Filed: Sep. 21, 2018, 2 pages.
Van Lunteren, "Access Processor"; U.S. Appl. No. 16/137,786, filed Sep. 21, 2018.
Balfour et al.; "An Energy-Efficient Processor Architecture for Embedded Systems"; IEEE Computer Architecture Letters, vol. 7, No. 1, Jan.-Jun. 2008; 4 pages.
Borkar; "Exascale Computing—a fact or a fiction?"; Intel Corp.; May 21, 2013; 49 pages.
Engbersen et al.; "SKA a bridge too far, or not?"; Exascale Radio Astronomy, AAS Topical Conference Series vol. 2., Proceedings of the conference held Mar. 30-Apr. 4, 2014 (Abstract Only); 3 pages.
Jongerius; "SKA Phase 1 Compute and Power Analysis"; CALIM 2014; 40 pages.
Kim et al.; "A Case for Exploiting Subarray-Level Parallelism (SALP) in DRAM"; ISCA 2012; 12 pages.
Liauw et al.; "Nonvolatile 3D-FPGA With Monolithically Stacked RRAM-Based Configuration Memory"; 2012 IEEE International Solid-State Circuits Conference; 3 pages.
Nair et al.; "Active Memory Cube: A processing-in-memory architecture for exascale systems"; International Business Machines Corporation (2015); 14 pages.
Papadimitriou et al.; "Performance of Partial Reconfiguration in FPGA Systems: A Survey and a Cost Model"; ACM Transactions on Reconfigurable Technology and Systems, vol. 4, No. 4, Article 36, Publication date: Dec. 2011; 24 pages.
Parvez et al.; "Application-Specific Mesh-Based Heterogeneous FPGA Architechtures"; Springer Science+Business Media LLC (2011); 23 pages.
Schilizzi et al.; "Preliminary Specifications for the Square Kilometre Array"; SKA, Dec. 10, 2007; 74 pages.

* cited by examiner

ACCESS PROCESSOR

BACKGROUND

The present invention relates to information processing apparatus, an information processing methods and programs.

In von-Neumann machines a central processor (CPU=central processing unit or GPU=graphics processing unit) may employ several mechanisms to overcome the so called "Memory Wall", which is a term to denote the growing performance gap between ever faster processors and comparably slower memory technologies. These mechanisms are in particular focused on tolerating longer access latencies of the main memory system in order to minimize the time that the processor's execution units are stalled. Or in other words: to maximize the utilization of the execution unit(s).

One of the features of these mechanisms is the use of a memory hierarchy comprising multiple levels of fast caches. Other mechanisms include support for out-of-order execution of instructions and multi-threading which both allow to continue processing with different instructions and/or threads when certain instructions or threads have been stalled while waiting for data to arrive from the memory system. Another example of a mechanism to reduce the (average) access latency is a prefetching of data from the memory system.

The above-mentioned techniques were disclosed in a time when the processor and memory system designs were not limited by power. Furthermore, the focus was mainly at maximizing the execution pipeline utilization by reducing the memory access latency. As a result, these mechanisms are typically among the most power-hungry components of a computer system, also wasting a considerable amount of memory bandwidth. For example, if the processor only needs a single byte, still a complete cache line may be retrieved from the memory system from which the remaining bytes are not used. The same applies to the prefetching of data that is typically only partially processed, if at all. Both cases do not only waste memory bandwidth, but also waste power for unneeded data accesses and operations.

In recent years, Field Programmable Gate Array (FPGA) technology continued to grow in importance as one of multiple programmable off-the-shelf accelerator technologies that can be used to improve performance and optimize power for selected application domains. As part of ongoing FPGA developments, the concept of dynamic partial reconfiguration support is gaining attention. The latter allows reconfiguring only selected parts of an FPGA during runtime.

SUMMARY

According to one embodiment, the invention is embodied as a computing system comprising at least one reconfigurable computing device. The computing device has a plurality of reconfigurable partitions and is adapted to perform parallel processing of operand data by the partitions. Furthermore, a memory unit is provided which is adapted to store configuration data to configure the partitions of the computing device, to store operand data to be processed by the configured partitions and to store processing results of the operand data. The computing system comprises a programmable memory access processor comprising a predefined program. The access processor is adapted to perform address generation, address mapping and access scheduling for retrieving the configuration data from the memory unit, for retrieving the operand data from the memory unit and for storing the processing results in the memory unit. The access processor is furthermore adapted to transfer the configuration data from the memory unit to the computing device and to transfer the operand data from the memory unit to the computing device. The computing device may be in particular embodied as a field programmable gate array (FPGA).

According to an embodiment of another aspect of the invention a computer implemented method is provided for operating a computing according to the first aspect. The method comprises a step of storing, by the memory unit, configuration data to configure the partitions of the computing device. The method comprises a further step of storing, by the memory unit, operand data to be processed by the configured partitions. The method comprises a further step of storing, by the memory unit, processing results of the operand data. In addition, the method comprises a step of performing, by the programmable memory access processor, address generation, address mapping and access scheduling according to a predefined program for retrieving the configuration data from the memory unit, for retrieving the operand data from the memory unit and for storing the processing results in the memory unit. The method comprises additional steps of transferring, by the programmable memory access processor, the configuration data from the memory unit to the computing device and transferring, by the programmable memory access processor, the operand data from the memory unit to the computing device.

Another aspect of the invention relates to a computer program product for operating a programmable memory access processor of a computing system. The computing system comprises at least one reconfigurable computing device with a plurality of reconfigurable partitions, a memory unit and the programmable memory access processor. The computer program product comprises a computer readable storage medium having program instructions embodied therewith. The program instructions are executable by the access processor to cause the access processor to perform a method comprising performing address generation, address mapping and access scheduling according to the program instructions for retrieving configuration data to configure the partitions of the computing device from the memory unit, for retrieving operand data to be processed by the configured partitions from the memory unit and for storing processing results of the operand data in the memory unit. The method executable by the program instructions furthermore comprises transferring the configuration data from the memory unit to the computing device and transferring the operand data from the memory unit to the computing device.

Embodiments of the invention will be described in more detail below, by way of illustrative and non-limiting examples, with reference to the accompanying drawings.

DETAILED DESCRIPTION

Figure 1:
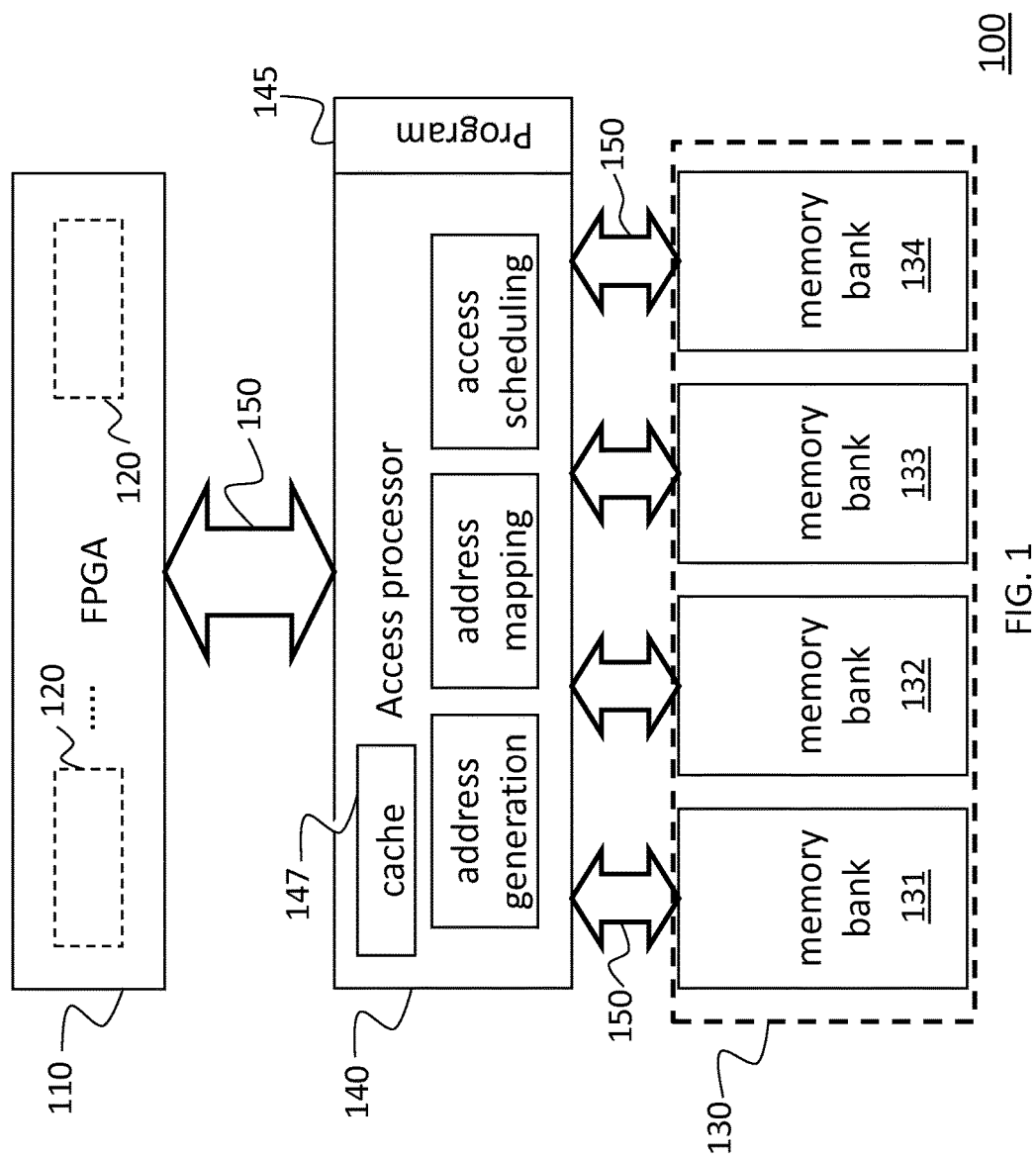
FIG. 1 shows a block diagram of a computing system according to an embodiment of the invention.

In reference to FIGS. 1-12, some general aspects and terms of embodiments of the invention are described. In the context of this description, the following conventions, terms and/or expressions may be used:

The term "access processor" may denote a dedicated processor for address generation, address mapping and access scheduling. In contrast to a classical general purpose processor, the access processor may be tightly integrated with, and be part of a memory unit. The access processor may be optimized to access one or more memory banks of the memory unit, typically in an interleaved fashion, to maximize the memory bandwidth utilization. Data retrieved from those memory banks may then be transferred over to the computing device. The memory access—in form of read and write accesses—and the bus and/or interconnect transfers may be scheduled in a combined fashion by the access processor. The access processor is programmable and may be programmed or preprogrammed with a predefined program.

The term "memory unit" may denote a memory of the computing system which may be organized in particular in memory banks. The memory unit may comprise e.g. DRAM memory cells. However, other technologies, e.g., SRAM or memristors, may also be used.

The term "field programmable gate array" (FPGA) may denote an integrated hardware circuit designed to be configured for one or more computing tasks by a system designer after manufacturing—hence "field-programmable". The one or more FPGA configurations may be generally specified using a hardware description language (HDL) and may have large resources of logic gates and RAM blocks to implement complex digital computations.

The term "operand data" may denote data that shall be processed by a reconfigurable computing device according to embodiments of the invention.

The term "configuration data" may denote data that shall be used to configure one or more partitions of the reconfigurable computing device for a specific function or computing task. Different configuration data may result in different functionalities of the one or more partitions of the computing device.

The term "address generation" may denote the generation of addresses by the access processor by the predefined program running on the access processor. The address space used for the address generation may be in particular a linear address space.

The term "address mapping", sometimes also referred to as address translation, may denote the mapping of the addresses generated by the predefined program running on the access processor upon the physical storage locations of the memory unit. As an example, mapping tables may be used to map/translate the addresses generated by the program running on the access processor into identifiers to select a memory bank within the memory unit, and identifiers to select a row and a column within a DRAM array comprising the selected bank, to store and retrieve data. The unit that typically handles this specific translation/mapping is often known as the memory controller. According to embodiments of the invention the access processor controls/performs this translation/mapping. According to embodiments a mapping table may map generated addresses on bank identifiers and offsets in the respective bank.

The term "access scheduling" may denote the scheduling of data retrieval/read operations and data storage/write operations. Access scheduling is typically performed by a memory controller and according to embodiments of the invention by the access processor. The access scheduling function of the access processor according to embodiments of the invention may control and determine in particular the sequence of memory accesses to the memory unit for a given queue of read/write requests, and the timing at which these are executed.

The term "memory bank" may denote a logical unit of the memory unit. A memory bank may comprise a plurality of rows and columns of storage units. In a single read or write operation, only one memory bank may be accessed.

The term memory access bandwidth may denote the rate at which data can be retrieved from or stored into a memory unit. Memory access bandwidth may be e.g. expressed in units of bytes/second. The memory access bandwidth is usually not fixed and depends on the type and pattern of data accesses. The memory access bandwidth can be influenced and/or controlled by a memory controller and according to embodiments of the invention by the access processor respectively. Memory bandwidth that is advertised for a given memory unit or memory system is usually the maximum theoretical bandwidth. As an example, the access scheduling function of the access processor may e.g. increase the memory access bandwidth that is available at a given moment in time, by scheduling multiple accesses that are directed to different memory banks and consequently can be performed in parallel, and/or by leaving pages open for subsequent accesses to the same page etc.

The term "three-dimensional chip" (3D chip) may denote an integrated circuit comprising different active electronic layers on top of each other which are electrically isolated against each other. Embodiments of the invention may implement memory banks in one layer of a 3D chip and the access processor and the computing device may be implemented in another layer of the 3D chip.

A computing system according to embodiments of the invention may provide a plurality of advantages. The access processor and the computing device may be located physically very close to and/or inside the memory unit. Data that may be processed using the computing device has to be transferred over a much shorter distance compared to traditional processor/memory architecture.

As the access processor performs address generation, address mapping and access scheduling for the retrieval of the configuration data and the operand data and the storage of the processing results, requirements for intermediate buffering of the configuration data, the operand data and the processing results may be minimized. This may result in a substantial reduction in power consumption. Thus, total power consumption of the integrated processor/memory system may go down while at the same time the overall processing speed may be increased. This advantage is a result of integrating and treating the computing device as part of the memory system and not as a separate CPU.

It may be noted that according to the proposed architecture, the prime responsibility for generating the sequence of instructions related to the memory operations is moved from a general purpose processor to the access processor.

According to embodiments the access processor is deeply integrated into the memory unit and exposed to full memory details like cycle times, bank organization and retention times. Basic operations of the memory unit are controlled by the access processor including address generation, access scheduling, address mapping and page open/close commands. Flexible address mapping in combination with address generation enables efficient interleaving over memory banks and memory lines. Consequently, data processing is moving close to the memory unit. This allows also an adaptation of the operation of the memory unit to the respective application.

The proposed computing system may be implemented in particular for applications that involve low locality of reference characteristics, and, consequently, for which conventional cache hierarchies do perform well. The latter requires that most data has be retrieved and transferred "all the way" from the main memory system to the processor. Performing the data processing close to the memory unit, can substantially reduce the distance over which data has to be transferred for this type of applications, and, as a result, can substantially improve the power efficiency.

FIG. 1 shows a block diagram of a computing system 100 according to an embodiment of the invention. The computing system 100 comprises a reconfigurable computing device 110 having a plurality of reconfigurable partitions 120. The reconfigurable computing device 110 is adapted to perform parallel processing of operand data by the partitions 120. The computing system 100 comprises a memory unit 130 having a plurality of memory banks, in this example a first memory bank 131, a second memory bank 132, a third memory bank 133 and a fourth memory bank 134. The memory unit 130 may store configuration data which can be used to configure the partitions 120 of the computing device 110 for a specific computation task. Furthermore, the memory unit 130 may store operand data. The operand data shall be processed by one or more of the partitions 120. More particularly, if one or more of the partitions 120 have been configured for a specific computing task, then the reconfigurable computing device 110 can perform the respective computing task with the operand data. In addition, the memory unit 130 is adapted to store the processing results of the operand data. In other words, once the computing task has been performed on the operand data by the one or more partitions 120 configured for the respective computing task, the results of these executed computing tasks are stored as processing results in the memory unit 130.

The computing system 100 comprises a programmable memory access processor 140. The access processor 140 comprises a predefined program 145 which may be e.g. pre-loaded. The access processor 140 is then adapted to execute this predefined program and perform address generation, address mapping and access scheduling for retrieving the configuration data from the memory unit. The access processor 140 is furthermore adapted to perform address generation, address mapping and access scheduling according to the predefined program for retrieving the operand data from the memory unit 130. And the access processor 140 is adapted to perform address generation, address mapping and access scheduling according to the predefined program for storing the processing results in the memory unit 130. In addition, the access processor 140 is adapted to transfer the configuration data from the memory unit 130 to the computing device 110 and to transfer the operand data from the memory unit 130 to the computing device 110. The access processor 140 may comprise a cache memory 147.

The computing device 110 may be in particular embodied as a field programmable gate array (FPGA). The FPGA supports partial configuration of the computing device 110.

According to a one embodiment the access processor 140 is adapted to map the configuration data and/or the operand data over the plurality of memory banks, i.e. in this example over two or more of the memory banks 131-134. According to embodiments, the access bandwidth allocated for transferring a particular set of configuration data can be varied by storing the configuration data across a number of memory banks. This is controlled by the address mapping function of the access controller. In general, the more banks are used to store a particular set of configuration data, the higher the possible access bandwidth to retrieve this data from the memory unit 130. According to embodiments the access processor 140 may perform this mapping based on a priority scheme that is programmed into the predefined program that is running on the access controller 140. As an example, it may be programmed that the configuration data for a first computing function A has high priority and shall be mapped over four memory banks, thereby allowing parallel and accelerated retrieving of this configuration data. In addition, it may be programmed that the configuration data for a second and third computing function B and C have low priority and shall therefore be only stored in one memory bank as no parallel and accelerated retrieval is needed for this configuration data.

The access processor 140, the computing device 110 and the memory unit 130 are coupled via an interconnect system 150. The interconnect system 150 may comprise e.g. dedicated links using packetized protocols for data transfer or it might be embodied as system bus. The interconnect system 150 may support the functions of a data bus to carry and transfer data, in particular the operand data and the configuration data, between the computing device 110 and the memory unit 130. Furthermore, the interconnect system may support the function of an address bus to address the respective location of the operand and configuration data for retrieval/read operations as well as for storage/write operations. In addition, the interconnect system 150 may provide the function of a control bus to control the retrieval/read operations as well as the storage/write operations.

The programmable access processor 140 has full control over all the basic memory operations of the memory unit 130 and acts as a master device for the memory unit 130 as well as for the computing device 110. In particular, in contrast to a conventional memory controller, the access processor 140 also performs the address generation for the retrieval/read operations as well as for the storage/write operations of the configuration data and the operand data. By performing all three functions, namely address generation, address mapping and access scheduling for the retrieval/read operations and for the storage/write operations, the access processor 140 is the full master of these operations and may use this in several advantageous ways to improve the performance of the computing system 100. In this respect it should be noted that in conventional systems the address generation for the retrieval/read operations and for the storage/write operations is usually done by the host processor while the address mapping and access scheduling is done by the memory controller. Accordingly in conventional systems the memory controller acts as a slave device of the host processor. On the other hand, the host processor in conventional systems does not perform address mapping and access scheduling which are done by the memory controller.

Allocating the functions of address generation, address mapping and access scheduling in the access processor, provides enhanced flexibility, freedom and functionality to the access processor 140 for optimizing the performance of the computing system 100. Because the access processor is provided detailed information about the memory unit, for example, implemented in its pre-loaded program, it can optimize the utilization of the available memory resources, something that is not possible to do at this level in a conventional system.

In particular, the access processor 140 may optimize according to embodiments of the invention the system level performance and power efficiency of the computing system 100 which are a function of the bandwidth assigned to the retrieval of the configuration data to perform reconfiguration operations and the bandwidth assigned to the retrieval of the operand data that are subsequently processed by one or more of the configured partitions of the computing device.

According to embodiments, the access processor 140 is adapted to control the memory access bandwidth assigned to the retrieval of the configuration data and the retrieval of the operand data according to a predefined scheme. Such predefined scheme may be e.g. a round robin scheme or a priority setting scheme.

Figure 2:
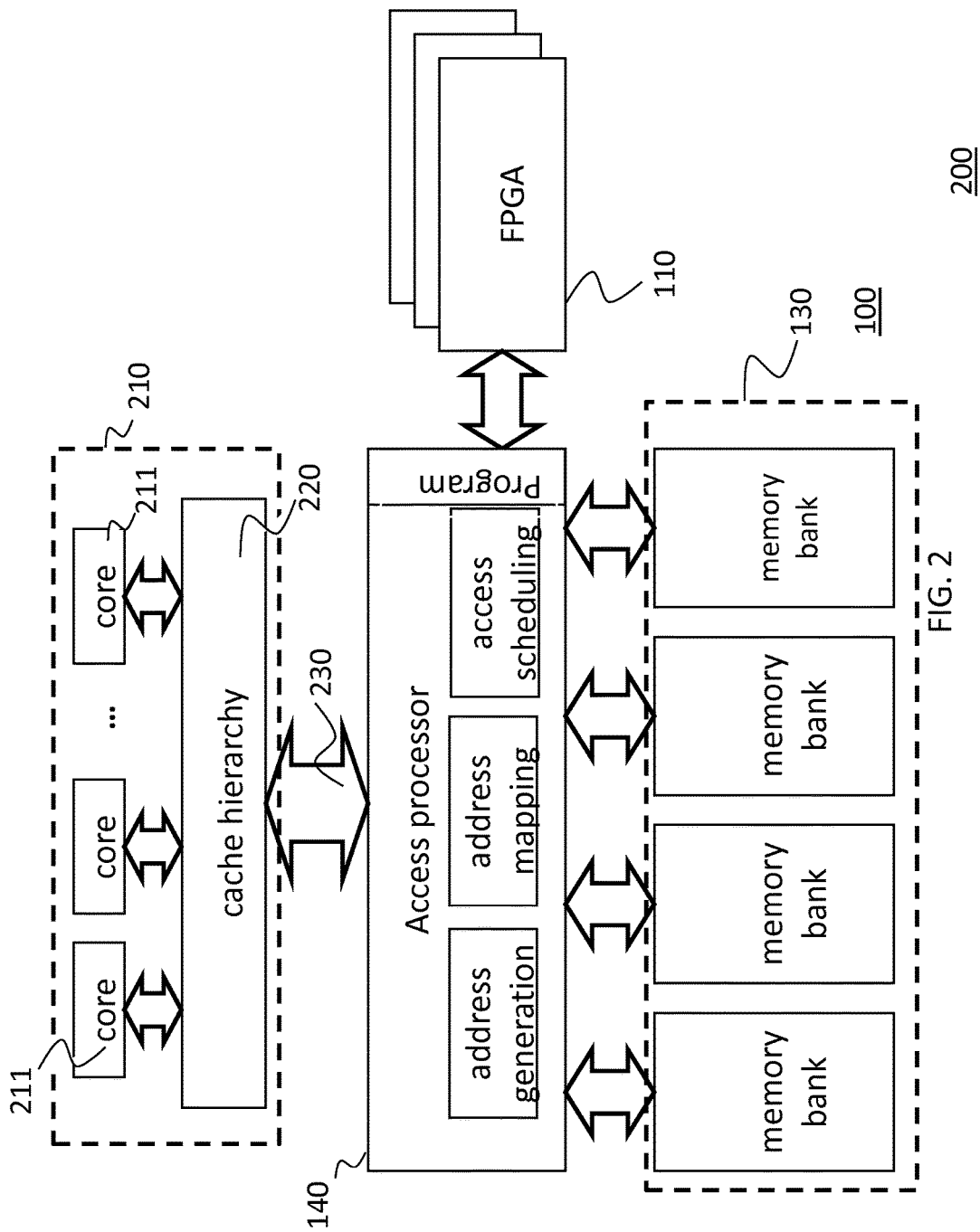
FIG. 2 shows a block diagram of another computing system according to an embodiment of the invention comprising a host processor.

FIG. 2 shows a computing system 200 comprising a host processor 210. The host processor 210 has a plurality of processing cores 211. The host processor 210 comprises furthermore a cache system 220 comprising a plurality of caches arranged in a cache hierarchy. The host processor 210 is communicatively coupled with the access processor 140 via an interconnect system 230. According to this embodiment the host processor 210 may use the computing device 110 to offload specific computation tasks. The offloaded computation tasks may be in particular computation tasks that are highly repetitive and that can be performed advantageously and quicker by a specialized hardware circuits, in particular by FPGAs, which are particularly configured for the respective computation tasks. In this respect the reconfigurable computing device 110 may serve as a hardware accelerator that performs the specific computation tasks for the host processor 210.

Figure 3:
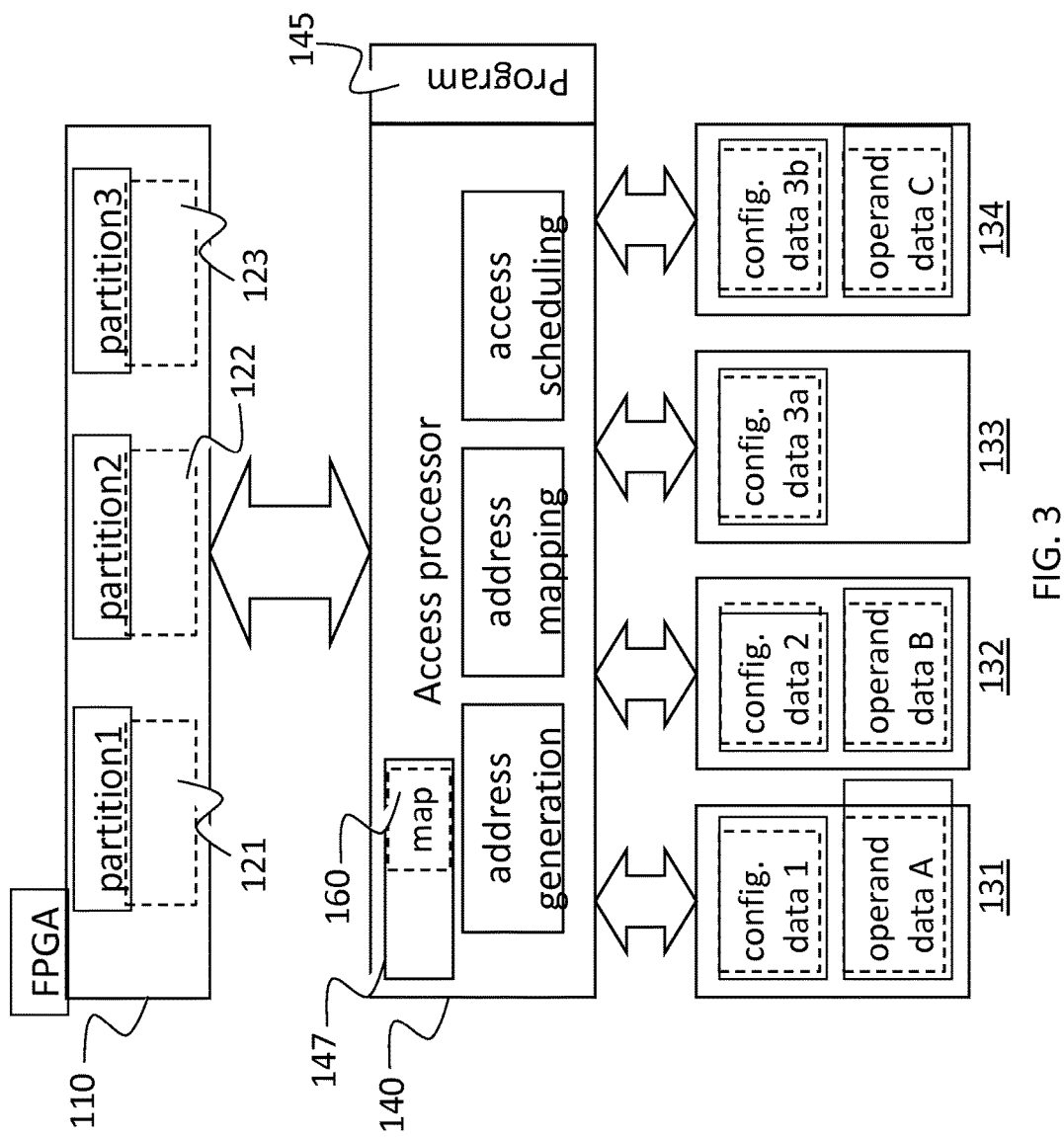
FIG. 3 shows an example of a mapping scheme of the memory unit 130 to illustrate one principle of a mapping scheme according to embodiments of the invention.

FIG. 3 shows an example of a mapping scheme of the memory unit 130 to illustrate one principle of a mapping scheme according to embodiments of the invention. According to this example the memory bank 131 stores operand data A and configuration data 1. The memory bank 132 stores operand data B and configuration data 2. The memory bank 133 stores configuration data 3a. The memory bank 134 stores operand data C and configuration data 3b. The operand data A, B and C may represent three different sets of operand data that shall be processed by one or more of the reconfigurable partitions of the computing device 110. The configuration data 1 and 2 may be e.g. configuration data to configure one or more of the partitions for a specific computing task. As an example, the configuration data 1 may comprise configuration data to configure the one or more partitions as fast fourier transformation (FFT) engine. The configuration data 2 may e.g. comprise configuration data to configure the one or more partitions as a matrix multiplier. The configuration data 3a and 3b belong together and form two parts of a set to configure the one or more partitions e.g. for a complex simulation task. The complex simulation task may be used e.g. to verify the design of a new microprocessor.

The configuration data 3a and 3b for the complex simulation task is mapped over two memory banks, namely the memory bank 133 and the memory bank 134. This allows the parallel retrieval of the configuration data 3a and 3b and a quicker configuration of the respective partition for the complex simulation task compared with a scenario where the configuration data 3a and 3b are stored in one and the same memory bank. This will be explained below in more detail.

Figure 4:
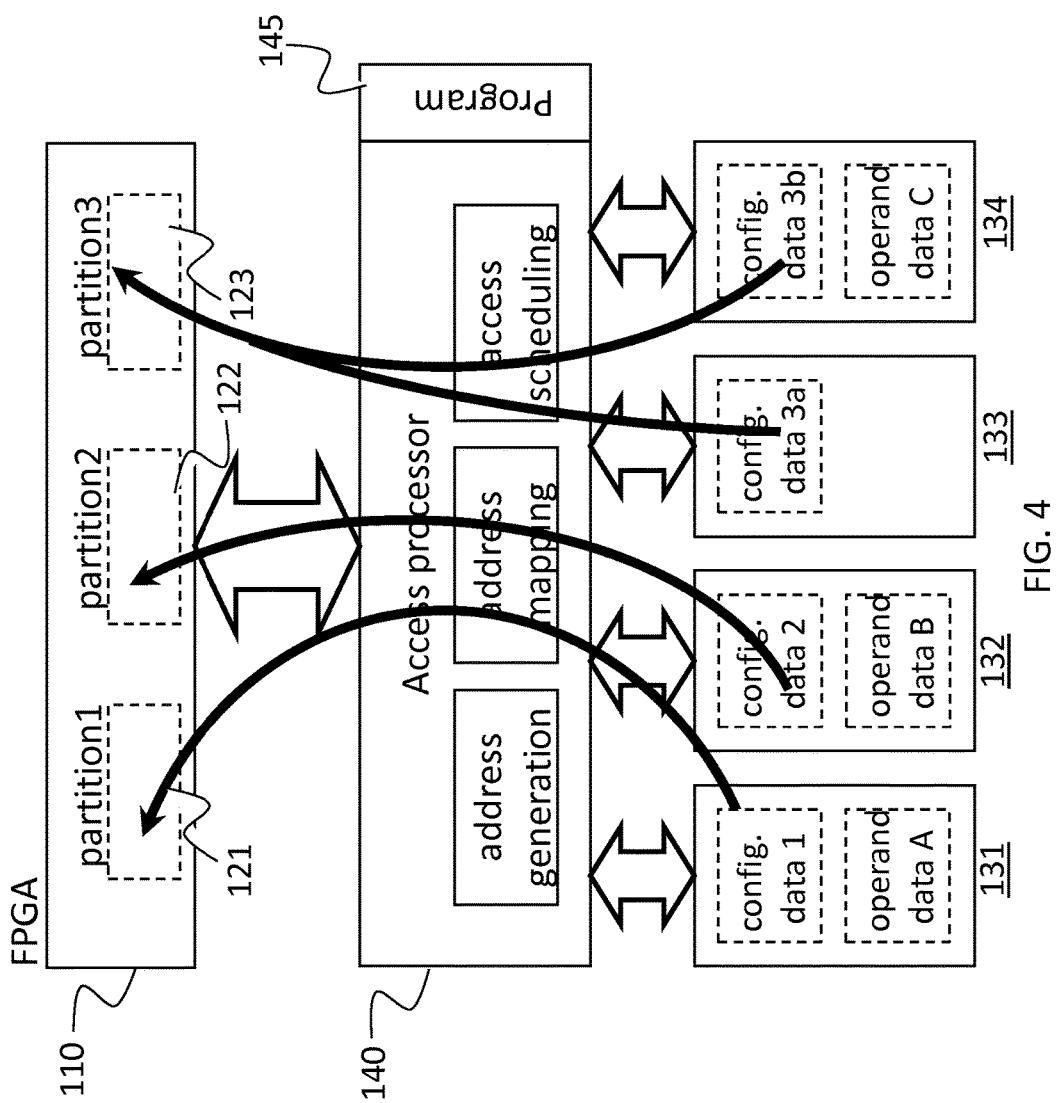
FIG. 4 illustrates an example according to which partitions of the computing device are configured simultaneously under control of the access processor.

FIG. 4 illustrates an example according to which a first partition 121, a second partition 122 and a third partition 123 are configured simultaneously under control of the access processor 140. The first partition 121 receives the configuration data 1 from the memory bank 131 and is thereby e.g. configured as FFT engine. The second partition 122 receives the configuration data 2 from the memory bank 132 and is thereby e.g. configured as matrix multiplier. The third partition 123 receives in parallel the configuration data 3a from the memory bank 133 and the configuration data 3b from the memory bank 134 and is thereby e.g. configured for the complex simulation task. As the configuration data 3a and 3b for the partition 123 is retrieved simultaneously from two different memory banks, namely the memory bank 133 and the memory bank 134, the configuration time for configuring the partition 123 can be significantly reduced compared with a serial retrieval of the configuration data 3a and 3b from only one single memory bank.

Figure 5:
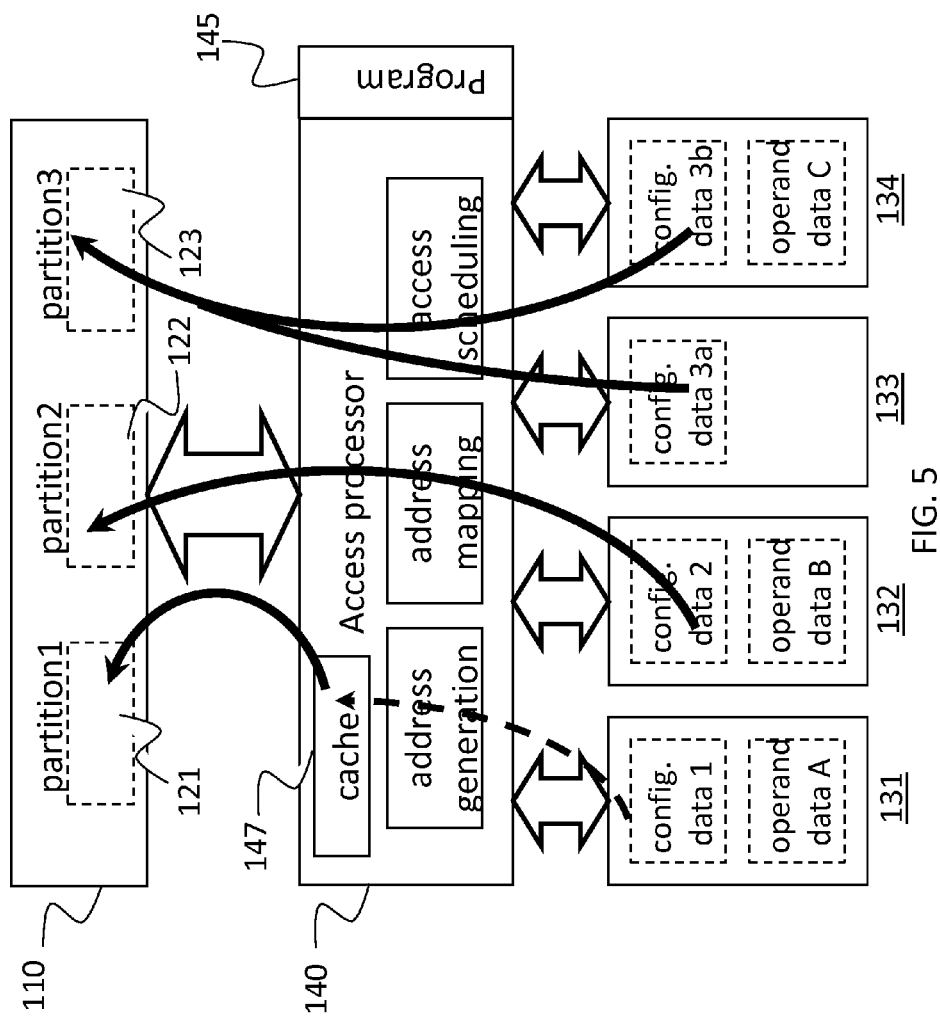
FIG. 5 illustrates an example according to which a partition is configured by transferring configuration data directly from a cache memory of the access processor.

FIG. 5 illustrates another example according to which the first partition 121, the second partition 122 and the third partition 123 are configured simultaneously under control of the access processor 140. In this example, the configuration data 1 is stored in the cache memory 147 of the access processor 140. This has been done in a former step as indicated with the dotted line. Then the partition 121 can be configured in a significantly shorter time by transferring the configuration data 1 directly from the cache memory 147 to the partition 121 because of the higher access bandwidth of the cache memory compared to the memory unit.

The access processor 140 may in particular store selected sets of configuration in the cache memory 147 for which high bandwidth is needed such that the corresponding partitions in the computing device 110 can be configured in the shortest possible time. The access processor may perform the selection of the configuration data that will be reside in the cache according to the predefined program 145.

Figure 6:
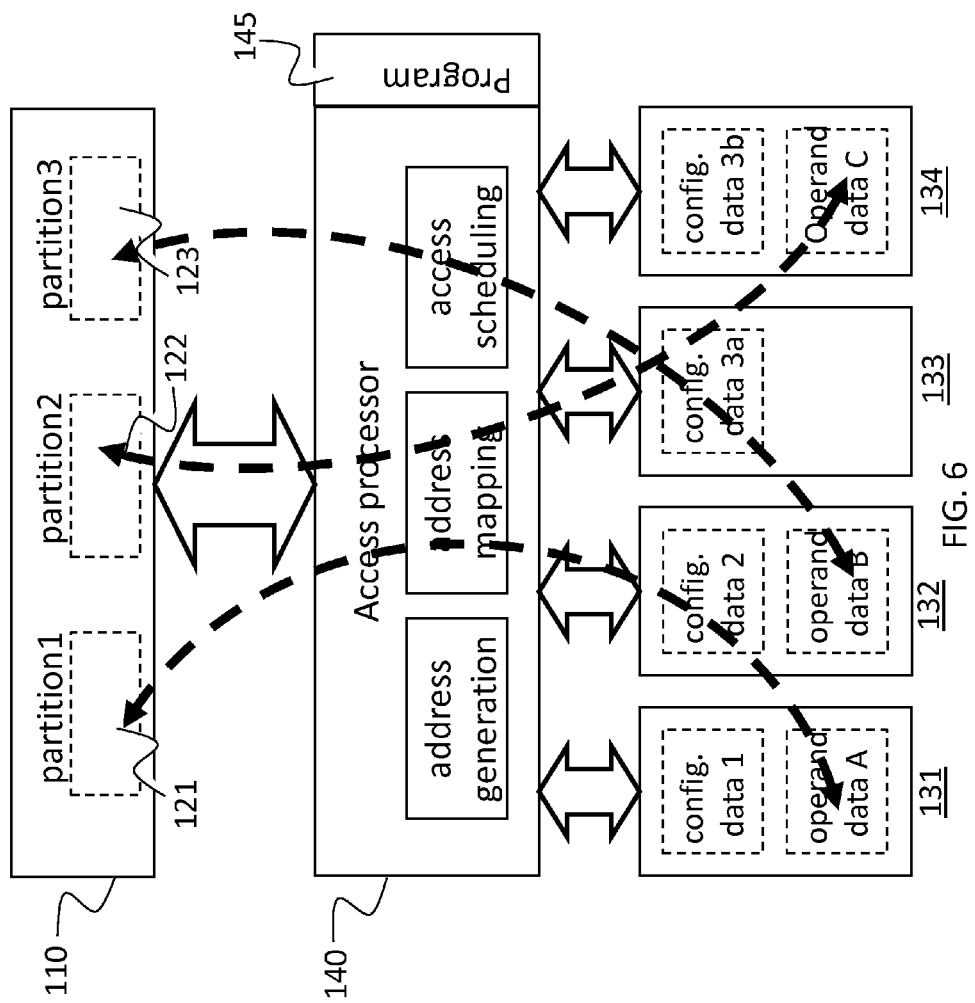
FIG. 6 illustrates an example according to which operand data and processing results are transferred in parallel between the computing device and the memory unit.

FIG. 6 illustrates an example according to which operand data and processing results are transferred in parallel between the computing device 110 and the memory unit 130. More particularly, operand data A is transferred from the memory bank 131 to the first partition 121 and corresponding result data is transferred back after processing to the memory bank 131. Furthermore, operand data B is transferred from the memory bank 132 to the third partition 123 and corresponding result data is transferred back after processing to the memory bank 132. Furthermore, operand data C is transferred from the memory bank 134 to the second partition 122 and corresponding result data is transferred back after processing to the memory bank 134.

Figure 7:
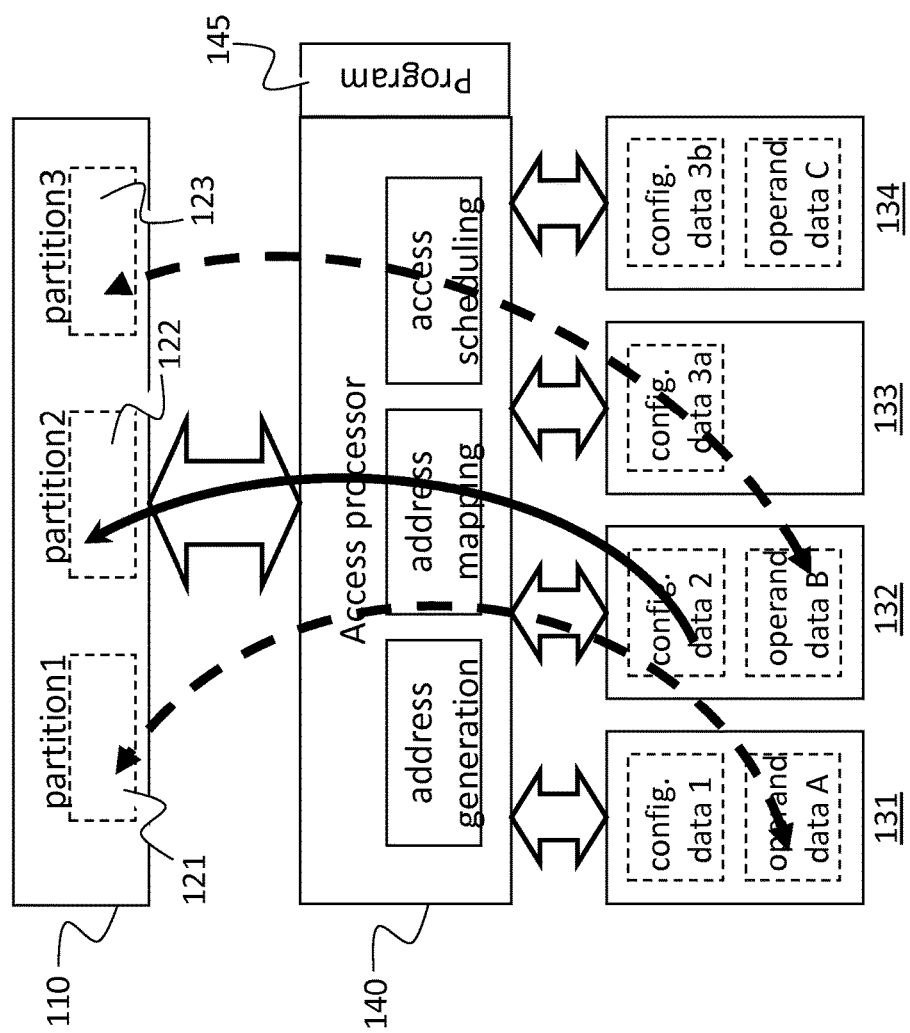
FIG. 7 shows an example according to which configuration data, operand data and processing results are transferred in parallel between the computing device and the memory unit.

FIG. 7 illustrates another example according to which configuration data, operand data and processing results are transferred in parallel between the computing device 110 and the memory unit 130. More particularly, the partition 122 is configured while operand data and processing results are transferred from and to partition 121 and partition 123. More particularly, operand data A is transferred from the memory bank 131 to the first partition 121 and corresponding result data is transferred back after processing to the memory bank 131. Furthermore, operand data B is transferred from the memory bank 132 to the third partition 123 and corresponding result data is transferred back after processing to the memory bank 132. In parallel, the second partition 122 is configured by transferring the configuration data 2 from the memory bank 132 to the second partition 122.

In the illustrations of FIG. 6 and FIG. 7 it is assumed that the result data is written back to the same memory region where the operand data is retrieved from. This is typical for example for inline FFT calculations. According to other embodiments the result data may be written at different memory regions.

According to a further embodiment the access processor 140 is configured to give priority to predefined accesses. Such predefined accesses may be programmed into the predefined program 145 according to which the access processor 140 is operated. The access scheduling function of the access processor 140 may take into account such priorities when scheduling access to the memory unit 130 for retrieving operand data and configuration data and when scheduling access to the memory unit 130 for storing processing results. As an example, it may be programmed that all FFT-processing tasks shall have priority over other processing tasks. A corresponding logic would be programmed in the predefined program 145. The access scheduling function would then schedule the access to the memory unit 130 according to this logic and would grant accesses for the retrieval of FFT operand data and FFT operand data priority over accesses for other configuration and operand data.

According to a one embodiment the access processor 140 is provided with a preset configuration time required for configuring one or more of the partitions 120 for a processing operation. The processing operation may be e.g. a specific computation task, e.g. a FFT computation. According to this embodiment the access processor 140 may be adapted to schedule the transfer of the operand data for the respective processing operation in accordance with the preset configuration time. The preset configuration times are the times that are needed to configure a partition 120 for a specific task and may be preprogrammed into the predefined program 145 running on the access processor 140. The preset configuration times may be e.g. derived from test runs performed to configure the partitions for the specific computation task.

As an example, it may be preprogrammed into the access processor 140 that a configuration of a partition as FFT engine needs e.g. the preset configuration time of X seconds. If the access processor 140 then gets a request to perform FFT calculations on a set of operand data, the access processor 140 is aware of the time it needs to configure the computing device 110 as FFT engine and the access processor 140 can then schedule already in parallel to the configuration of the computing device 110 as FFT engine the corresponding transfer of the operand data to the FFT engine without having to wait e.g. for an acknowledgment of the computing device 110 that the FFT engine has been configured. Such an approach accelerates the processing of the operand data, saves additional signaling and is thereby also energy-efficient.

According to a further embodiment the access processor 140 may be adapted to perform a predefined set of configuration operations and/or processing operations according to predefined parameters/settings. Such an approach may be e.g. used in order to realize a particular configuration performance, e.g. a fast configuration time for configuration data A having a higher priority and a slow/slower configuration time for configuration data B having a lower priority. The predefined parameters/settings may be programmed into the predefined program 145 of the access processor 140.

According to a further embodiment the access processor 140 is adapted to first preprocess configuration data stored in the memory unit 130 and then subsequently configure a partition of the computing device 110 with the preprocessed configuration data. Such preprocessing may comprise e.g. the decompression, the decryption and/or other data manipulations of the configuration data.

According to a further embodiment the access processor 140 is adapted to provide a broadcast function. The broadcast function may be used for transferring the same configuration data simultaneously to multiple partitions. Such a broadcast function allows parallel partitioning of several partitions for one and the same processing operation, and subsequently parallel processing of the operand data. This enhances the speed of the corresponding processing operation.

According to a further embodiment the access processor 140 is adapted to store a map 160 of the configured partitions of the computing device 110. Such a map 160 may be stored e.g. in the cache memory 147 of the access processor 140 to ensure a fast availability. The map 160 may be e.g. implemented as a simple lookup table. According to such an embodiment the access processor 140 keeps track for the partitions 120 which configurations were downloaded/transferred to each of those partitions.

If then the access processor receives a set of operand data that is to be processed by a specific processing task, the access processor checks by means of the map 160 whether there is already a partition 120 available in the computing device 110 for the specific processing task. As an example, if the access processor receives a request to perform a FFT operation on the received operand data, the access processor will look into the map 160 and check whether already one of the partitions 120 is configured as FFT-engine. If this is the case, the access processor 140 transfers the operand data to the respective partition. This saves the whole step of configuring the partition. Only if the map 160 reveals that there is no partition in the computing device 110 that has already been configured for the required processing task, then the access processor 140 retrieves the corresponding configuration data from the memory unit 130 and subsequently transfers the configuration data to the computing device 110 after which the access processor 140 transfers the operand data to newly configured partition.

According to a further embodiment the access processor is adapted to configure a plurality of partitions for a common/combined processing task. As an example, for a set of operand data at first a FFT computation shall be performed and subsequently the results of the FFT computation shall be provided as input data for further processing by a complex simulation engine. According to this embodiment the access processor may configure the partition for the FFT computation and the partition for the complex simulation in parallel and control then also the operation of the common processing task in a distributed fashion. As an example, the access processor 140 may then according to embodiments directly transfer the results of the computation of the first partition, in this example the results of the FFT engine, to the second partition of the combined task, in this example the complex simulation engine. Several further embodiments may be envisaged for this aspect of the invention. The access processor 140 may control the interconnection between the partitions of the common processing task e.g. by setting multiplexers such that these will operate in a SIMD type of fashion or in a pipeline fashion or as a hybrid version.

Figure 8:
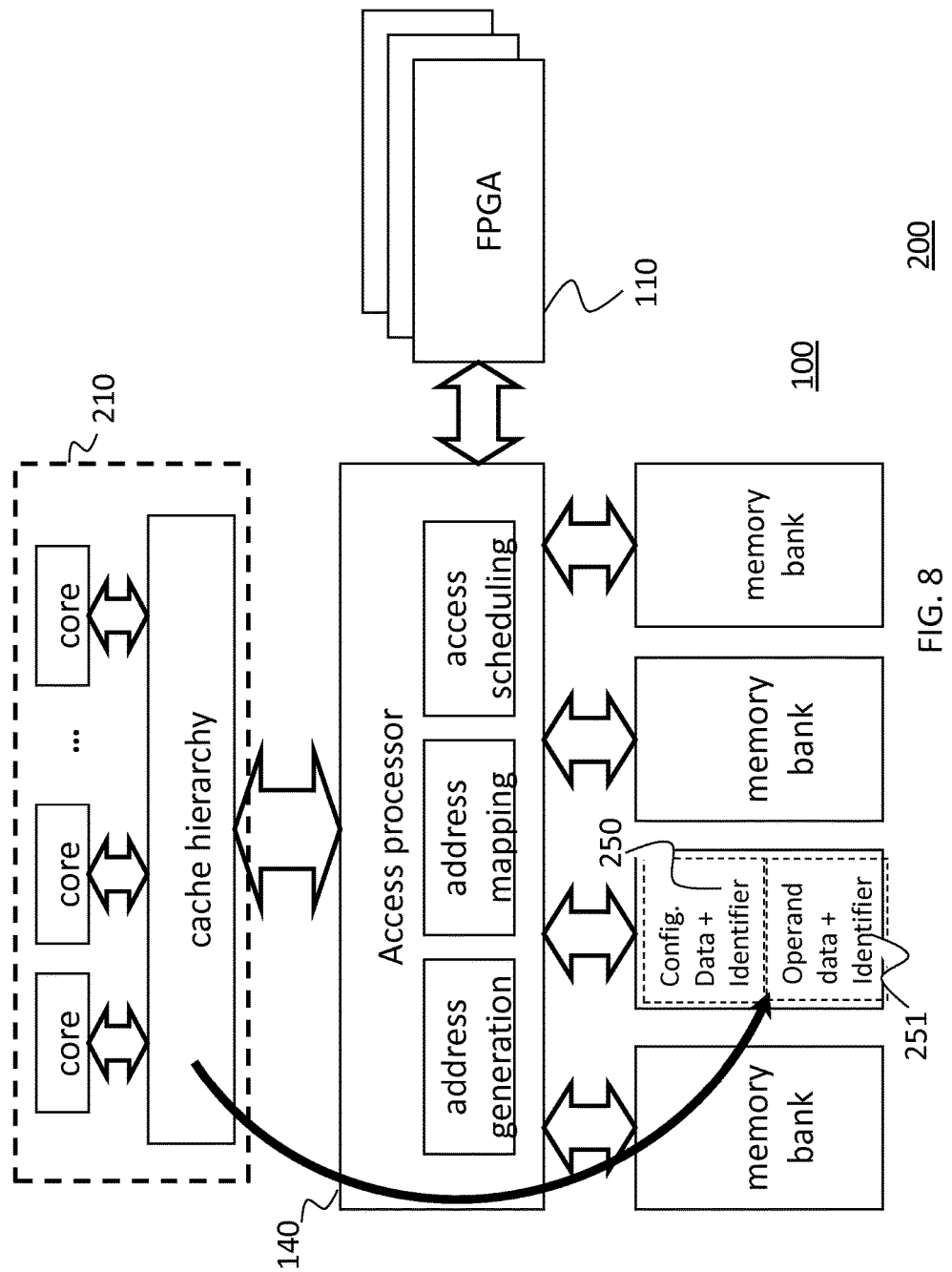
FIG. 8 illustrates an example according to which a host processor offloads a computing task to the computing device by transferring configuration data and operand data.

FIG. 8 illustrates an example of an operation of the computing system 200 comprising the host processor 210 as described with reference to FIG. 2. To initiate an offloading of specific computations tasks to the reconfigurable computing device 110, the host processor 210 sends configuration data comprising a configuration data identifier or only a configuration data identifier to the computing system 100. The configuration data identifier comprises information regarding the type and identity of the configuration data. As an example, the host processor may send FFT configuration data for configuring the computing device 110 as FFT engine and a corresponding identifier that indicates to the computing system 100 that the configuration data is FFT configuration data. Alternatively the configuration data may already be available in the memory unit 130 and hence the host processor 210 may only send the configuration data identifier. Furthermore, the configuration data identifier may comprise additional information concerning the FFT-configuration data, e.g. constraints related to the partitions that can be configured using the configuration data and/or information related to processing to be performed on the configuration data by the access processor 140.

After receipt of the configuration data the access processor 140 may then transfer the received configuration data to one of the partitions of the computing device 110 and configure the selected partitions with the configuration data received from the host processor 210 for the respective computation task. After sending the configuration data or in parallel to sending the configuration data the host processor 210 sends furthermore the operand data for the FFT computation or only a configuration data identifier to the computing system 100. The operand data comprises an operand data identifier that indicates a processing task to be performed on the operand data. In this example, the operand data identifier indicates that the operand data is data for which a FFT-processing shall be performed by the computing system 100. Alternatively the operand data may already be available in the memory unit 130 and hence the host processor 210 may only send the operand data identifier.

After receipt of the operand data, the access processor 140 may then transfer the received operand data to the respective partition of the computing device 110 that has been configured as FFT engine and then the FFT engine running on the computing device 110 performs the FFT calculations. After finishing the FFT calculations on the operand data, the processing results of the FFT calculations may be stored in the memory unit 130 or may be send back to the host processor 210.

Figure 10:
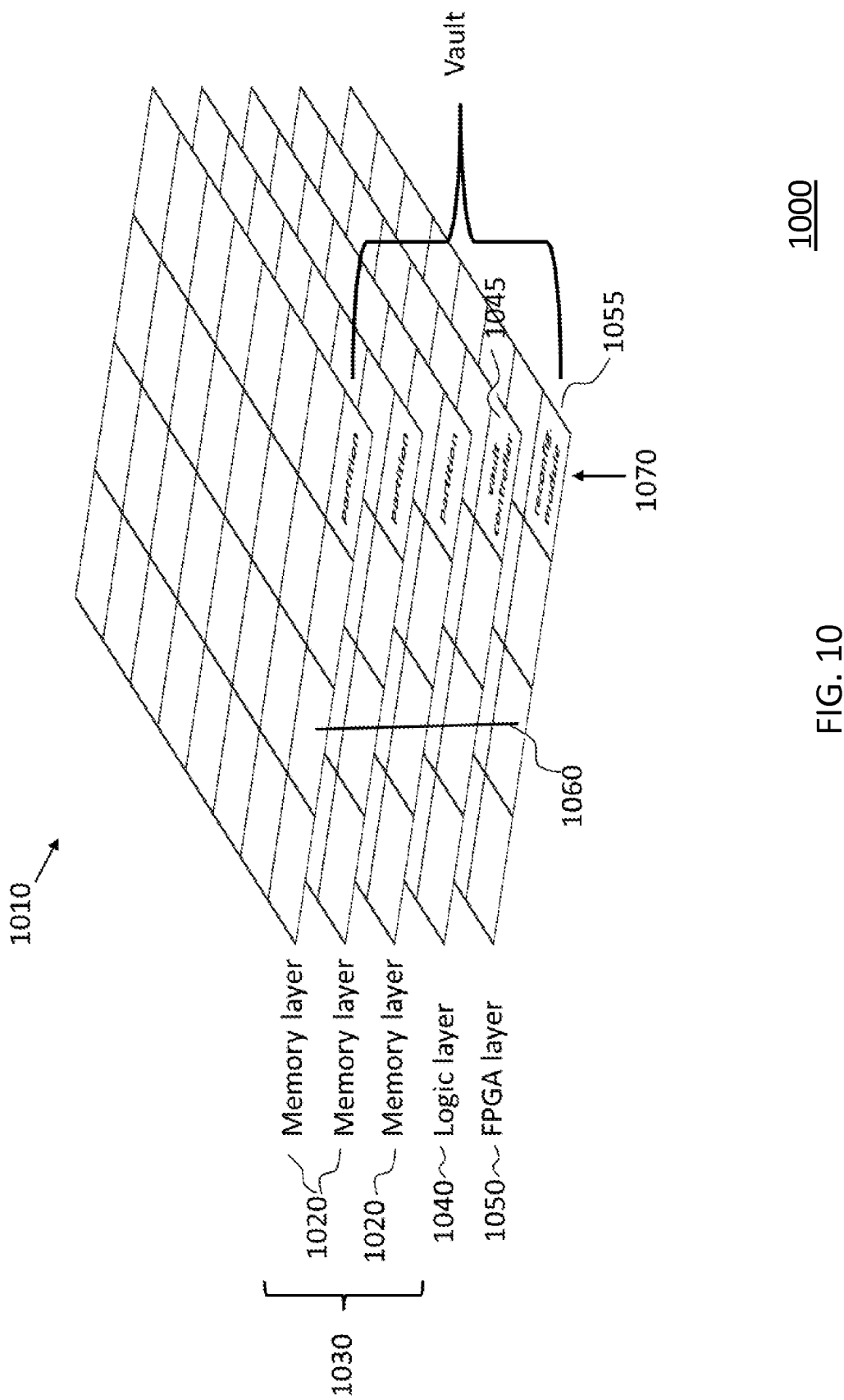
FIG. 10 shows an embodiment of a computing system which is implemented as a 3-dimensional chip stack.

FIG. 10 shows an embodiment of a computing system 1000 which is implemented as a 3-dimensional chip stack 1010. The 3-dimensional chip stack 1010 comprises a plurality of vertical layers. The vertical layers include a plurality of memory layers 1020. The memory layers 1020 establish a memory unit 1030. The 3-dimensional chip stack 1010 comprises furthermore a logic layer 1040 and a computing layer 1050, the latter also denoted as FPGA layer. The vertical layers are coupled via Through Silicon Vias (TSVs) 1060. The 3-dimensional chip stack 1010 comprises a plurality of vertical columns of memory partitions, in the following denoted as vaults 1070. The vaults 1070 comprise furthermore a corresponding partition in the logic layer 1040 and the computing layer 1050. The logic layer 1040 comprises an access processor 1045, also denoted as vault controller.

The computing layer 1050 comprises a reconfigurable computing device 1055, more particularly an FPGA, also denoted as reconfigurable module. The transfer of data between the memory layers 1020, the computing layer 1050 and the logic layer 1040 is performed via the TSVs 1060. In particular, the access processor 1045 is adapted to retrieve and transfer the operand data and the configuration data via the TSVs 1060.

Such a 3-dimensional chip stack 1010 may be used to realize very power-efficient computing systems. The proposed combination of 3D stacking with reconfigurable computing devices in FPGA technologies may offer several advantageous implementations. In these stacks, the vertical columns of memory partitions may share a common access processor and can be accessed in a combined fashion. This includes the assignment/mapping of memory vaults to FPGA partitions that can be independently reconfigured. According to embodiments, the vaults may be tightly interconnected to those reconfigurable partitions and the reconfigurable partitions may provide a configurable near-memory processing function that can be reconfigured without interrupting the processing of the data in the remaining vaults. This approach allows to apply multiple different functions (e.g. algorithms) on the same operand data without having to move the operand data while being able to implement those functions very efficiently in reconfigurable hardware. Hence such 3-dimensional chip stack may be in particular suitable for Big Data workloads.

Figure 9:
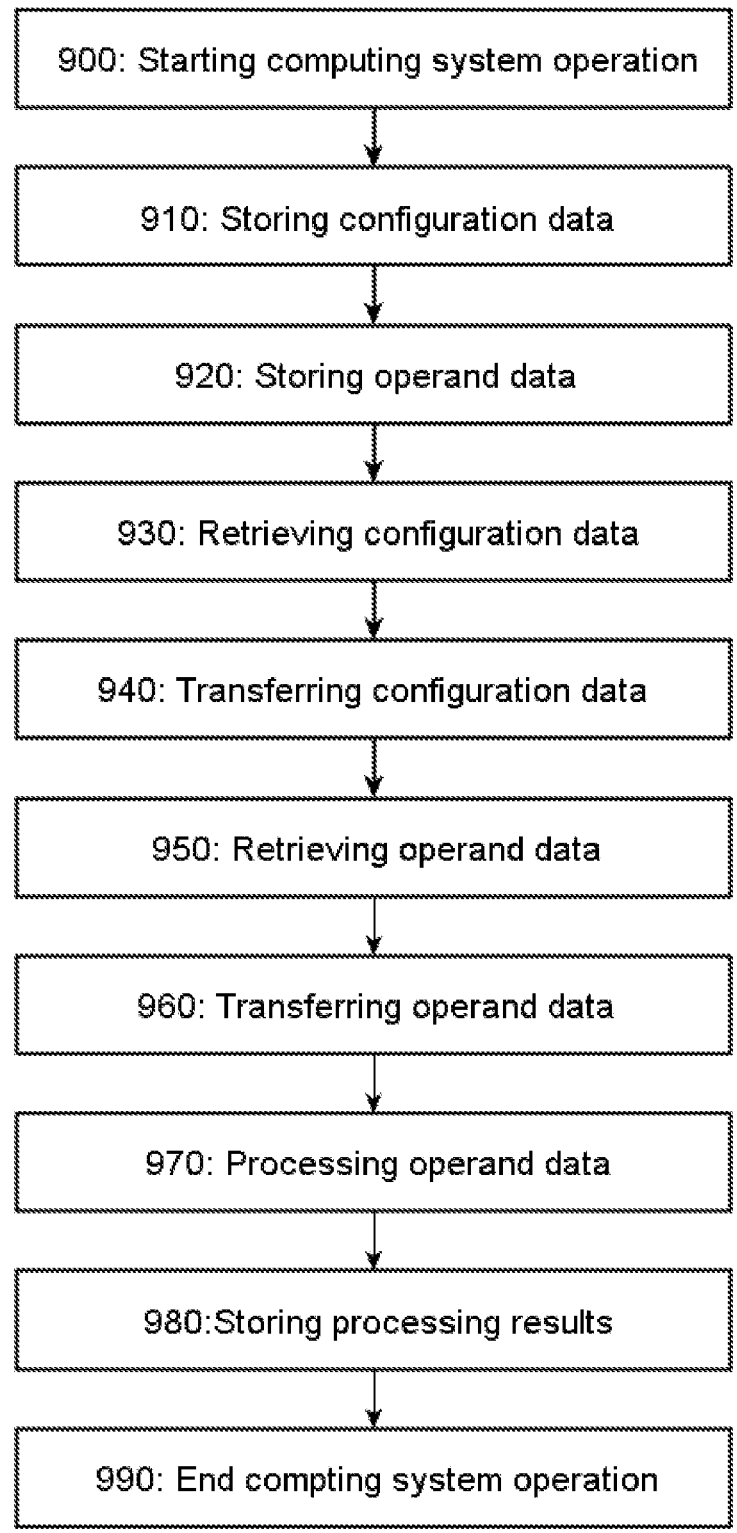
FIG. 9 shows a flow chart of a method according to an embodiment of the invention.

FIG. 9 shows method steps of a computer implemented method for operating a computing system. The computing system may be e.g. the computing system 100 of FIG. 1 comprising the reconfigurable computing device 110 with the plurality of reconfigurable partitions 120, the memory unit 130 and the programmable memory access processor 140. As shown at block 900, the method is started. As shown at block 910, configuration data is stored by the memory unit 130 to configure the partitions 120 of the computing device 110. The block 910 may include mapping of the configuration data over multiple banks of the memory unit 130, in particular for configuration data with high priority that shall be provided for an accelerated retrieval for fast configuration. As shown at block 920 operand data is stored by the memory unit 130, the operand data being data that shall be processed by one or more of the configured partitions. The block 920 may include mapping of the operand data over multiple banks of the memory unit 130, in particular for operand data with high priority that shall be provided for an accelerated retrieval for fast processing. As shown at block 930, the configuration data is retrieved from the memory unit 130 under control of the access processor 140, wherein the access processor 140 performs address generation, address mapping and access scheduling for the retrieval according to the predefined program 145.

As shown at block 940, the retrieved configuration data is transferred from the memory unit 130 to the computing device 110 under control of the access processor 140. As shown at block 950, the operand data is retrieved from the memory unit 130 under control of the access processor 140, wherein the access processor performs address generation, address mapping and access scheduling for the retrieval according to the predefined program 145. The blocks 930 and 950 may comprises controlling the memory access bandwidth assigned to the configuration data and the operand data according to a predefined scheme. As shown at block 960, the retrieved operand data is transferred from the memory unit 130 to the computing device 110 under control of the access processor 140. As shown at block 970 the operand data are processed by a partition 120 that has been configured with the configuration data. As shown at block 980, the processing results (output data) are stored in the memory unit 130 under control of the access processor 140, wherein the access processor 140 performs address generation, address mapping and access scheduling for the storing according to the predefined program 145. The block 980 includes the transfer of the processing results from the partition to the memory unit. As shown at block 990, the operation of the computing system is stopped.

Figure 11:
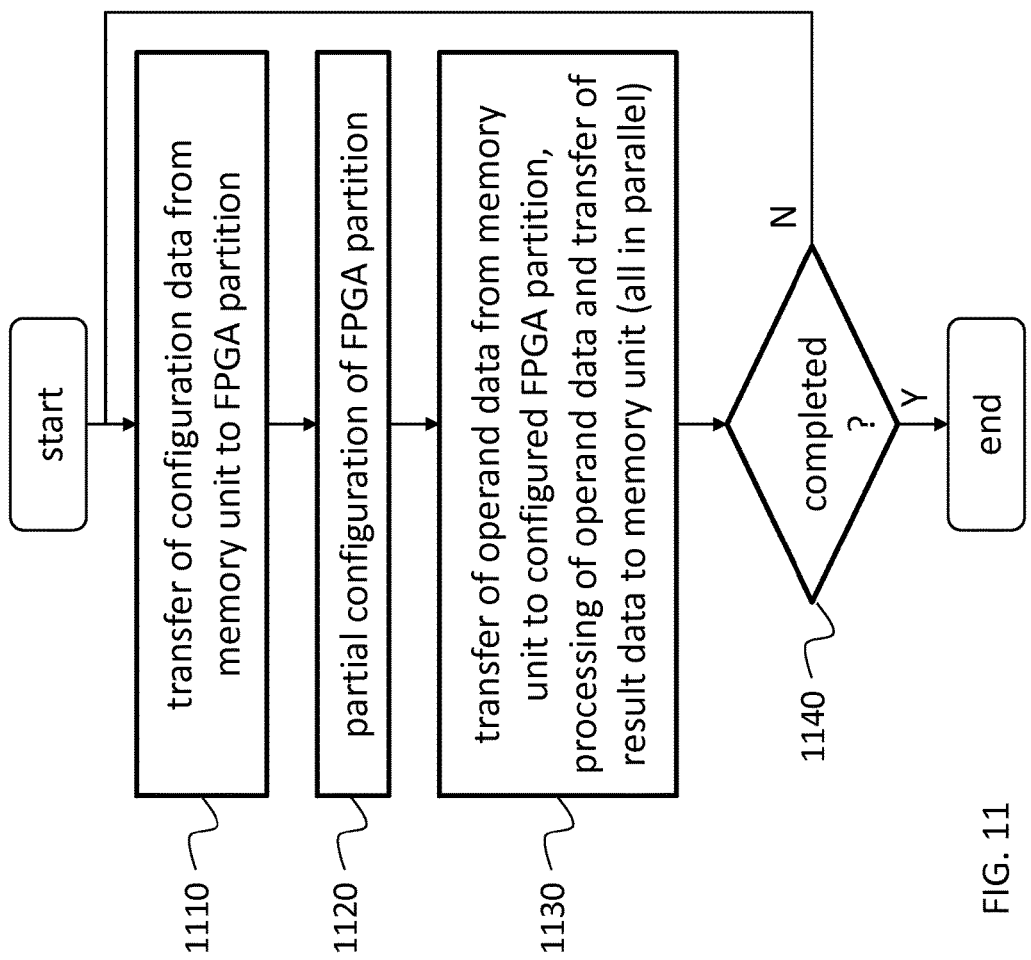
FIG. 11 shows a flow chart of a method according to another embodiment of the invention.

FIG. 11 shows a flow chart of a further method according to an embodiment of the invention. As shown at block 1110, configuration data is transferred from the memory unit 130 to one of the partitions 120, also denoted as FPGA partitions, of the computing device 110. As shown at block 1120, the respective FPGA partition is configured with the configuration data. As shown at block 1130, in parallel operand data are transferred from the memory unit 130 to the configured FPGA partition, the operand data are processed by the FPGA partition and the processing results are transferred back to the memory unit 130. As shown at block 1140 the access processor 140 checks whether all pending requests have been completed. If "yes", the access processor 140 stops its operation. If "no", the access processor may continue with block 1110.

Figure 12:
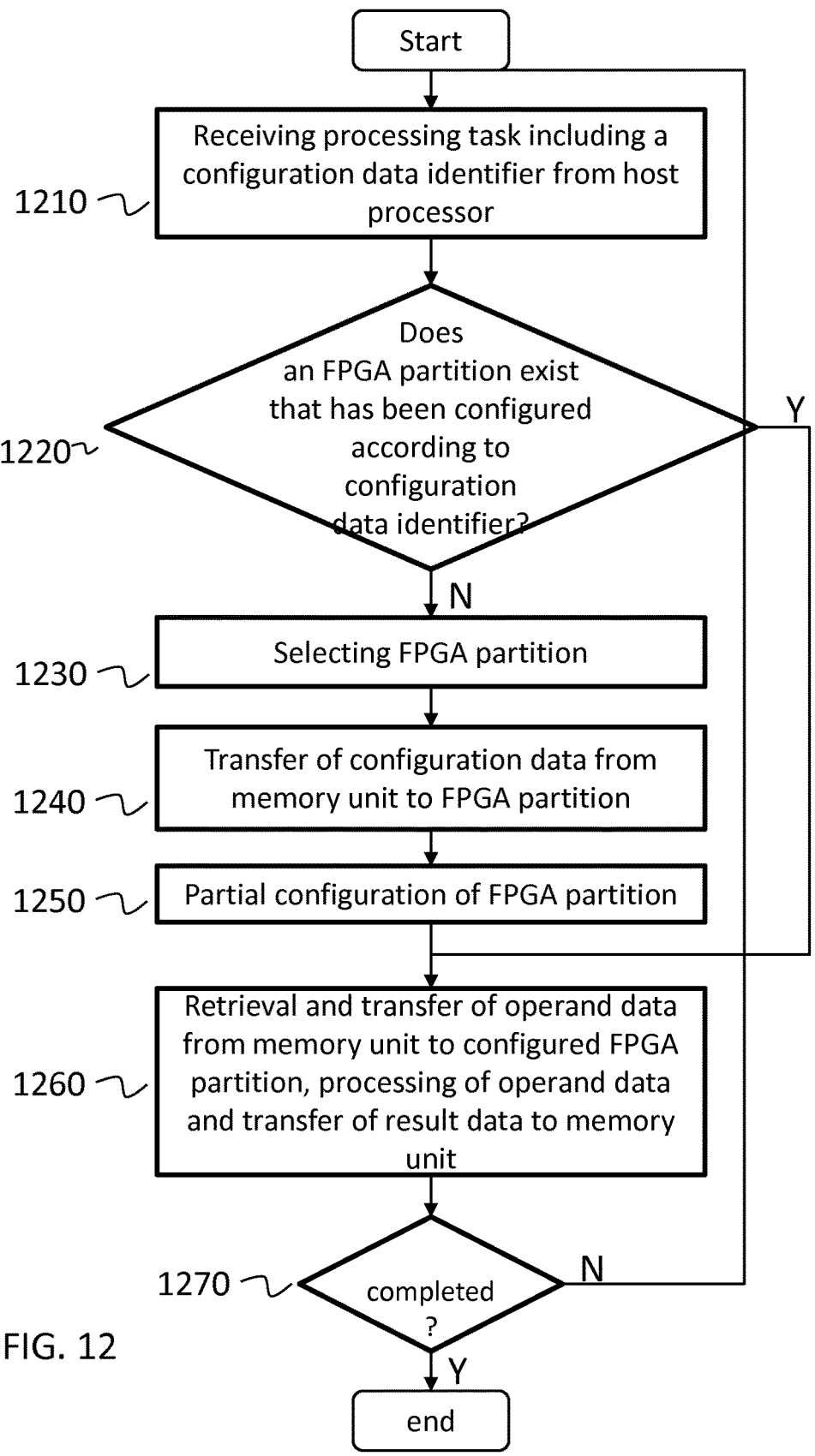
FIG. 12 shows a flow chart of a method according to another embodiment of the invention.

FIG. 12 shows a flow chart of a further method according to an embodiment of the invention. As shown at block 1210, the access processor 140 receives a processing task including a configuration data identifier from the host processor 210. The configuration data identifier indicates a processing task that shall be performed. As an example, this could be an identifier that indicates that a FFT-processing shall be performed. The corresponding configuration data may be already stored in the memory unit 130 or may also be sent by the host processor, e.g. from another memory unit or the cache of the host processor. Furthermore, operand data including an operand data identifier may be received from the host processor. According to other embodiments the operand data may already be available in the memory unit 130. In the latter case the host processor may only send an address pointer indicating the memory address of the operand data.

As shown at block 1220 it is checked whether an FPGA partition exists already on the computing device 110 that has been configured according to the configuration data identifier, i.e. for the computing task that shall be performed on the operand data received from the host processor. The checking may be e.g. performed by looking into the map 160 stored in the computing device 110 as described with reference to FIG. 3. The map may be e.g. implemented as a simple lookup table. If "yes", the method continues with block 1260. If "no", as shown at block 1230 an FPGA partition 120 is selected on the computing device 110 that is free, i.e. not in use. As shown at block 1240, configuration data corresponding to the configuration data identifier is transferred from the memory unit 130 to the selected partition of the computing device 110. As shown at block 1250, the selected partition/FGPA partition is configured with the configuration data. As shown at block 1260, corresponding operand data are retrieved and transferred from the memory unit 130 to the configured FPGA partition. Furthermore the operand data are processed by the FPGA partition and the processing results are transferred back to the memory unit 130. As shown at block 1270, the access processor 140 checks whether all pending request have been completed. If "yes", the access processor 140 stops its operation. If "no", the access processor 140 may continue with block 1210.

Aspects of the invention may be embodied as a computer program product for operating the programmable memory access processor 140 of the computing system 100. The computer program product may be embodied as the predefined/preloaded program 145 that is executed by/running on the access processor 140. The computer program product comprises a computer readable storage medium having program instructions embodied therewith. The program instructions may be executable by the access processor 140 to cause the access processor 140 to perform methods according to embodiments of the invention as described above.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system comprising:
   at least one reconfigurable computing device, the reconfigurable computing device having a plurality of reconfigurable partitions and being adapted to perform parallel processing of operand data by the partitions;
   a memory unit adapted to:
      store configuration data to configure the partitions of the reconfigurable computing device;
      store operand data to be processed by the configured partitions; and
      store processing results of the operand data; and
   a programmable memory access processor comprising a predefined program, the access processor being adapted to:
      receive a preset configuration time for configuring one or more of the partitions for a processing operation, the preset configuration time is an amount of time that is required for configuring the one or more of the partitions for the processing operation;
      perform address generation, address mapping and access scheduling for:
         retrieving the configuration data from the memory unit;
         retrieving the operand data from the memory unit; and
         storing the processing results in the memory unit;
      schedule a transfer time for a transfer of the operand data from the memory unit to the reconfigurable computing device for the processing operation in accordance with the preset configuration time;
      transfer the configuration data from the memory unit to the reconfigurable computing device; and
      transfer the operand data from the memory unit to the reconfigurable computing device at the transfer time.

2. A computing system according to claim 1, wherein the reconfigurable computing device is a field programmable gate array (FPGA).

3. A computing system according to claim 1, wherein the memory unit comprises a plurality of memory banks and wherein the access processor is adapted to map the configuration data and/or the operand data over multiple banks.

4. A computing system according to claim 1, wherein the access processor is adapted to control the memory access bandwidth assigned to the retrieval of the configuration data and the operand data according to a predefined scheme.

5. A computing system according to claim 4, wherein the predefined scheme is one of: a round robin scheme and a priority setting scheme.

6. A computing system according to claim 1, wherein the preset configuration time is derived by the access processor from test runs performed to configure the partitions for the processing operation.

7. A computing system according to claim 6, wherein the access processor is adapted to perform a predefined set of configuration operations and/or processing operations according to predefined parameters.

8. A computing system according to claim 1, the computing system comprising a cache memory, the access processor being adapted to store a preselected set of configuration data in the cache memory to facilitate an accelerated configuration of a partition with the preselected configuration data.

9. A computing system according to claim 1, the access processor adapted to:
preprocess configuration data stored in the memory unit; and
configure a partition of the reconfigurable computing device with the preprocessed configuration data.

10. A computing system according to claim 1, wherein the access processor is adapted to provide a broadcast function, the first broadcast function being provided for transferring the same configuration data simultaneously to multiple partitions.

11. A computing system according to claim 1, wherein the access processor is adapted to:
store a map of the configured partitions of the reconfigurable computing device;
check, upon receipt of operand data for a processing task, whether a partition is already configured for the processing task;
transfer the operand data to the respective partition, if a partition is already configured for the processing task; and
configure a new partition for the processing task, if no partition is already configured for the processing task.

12. A computing system according to claim 1, wherein the access processor is adapted to:
configure a plurality of partitions for a common processing task; and
control the operation of the common processing task in a distributed fashion.

13. A computing system according to claim 1, further comprising at least one host processor, communicatively coupled with the access processor, wherein the access processor is adapted to:
receive a configuration data identifier from the host processor, the configuration data identifier indicating a type and identity of the configuration data; and
receive an operand data identifier from the host processor, the operand data identifier indicating a processing task to be performed on the operand data.

14. A computing system according to claim 1, wherein the computing system comprises a 3-dimensional chip stack having a plurality of vertical layers, the vertical layers comprising:
a plurality of memory layers comprising the memory unit;
a logic layer comprising the access processor; and
a computing layer comprising the reconfigurable computing device.

15. A computing system according to claim 14, wherein the vertical layers are coupled via Through Silicon Vias (TSVs) and wherein the access processor is adapted to retrieve and transfer the operand data and the configuration data via the TSVs.

16. A computing system according to claim 14, wherein the 3-dimensional chip stack comprises a plurality of vertical columns of memory partitions (vaults), wherein each vault further comprises an access processor in the logic layer and a computing device in the computing layer.

17. A computer implemented method for operating a computing system, the computing system comprising at least one reconfigurable computing device with a plurality of reconfigurable partitions, a memory unit and a programmable memory access processor, the method comprising:
storing, by the memory unit, configuration data to configure the partitions of the reconfigurable computing device;
storing, by the memory unit, operand data to be processed by the configured partitions;
storing, by the memory unit, processing results of the operand data;
receiving, by the programmable memory access processor, a preset configuration time for configuring one or more of the partitions for a processing operation, the preset configuration time is an amount of time that is required for configuring the one or more of the partitions for the processing operation;
performing, by the programmable memory access processor, address generation, address mapping and access scheduling according to a predefined program for:
retrieving the configuration data from the memory unit;
retrieving the operand data from the memory unit; and
storing the processing results in the memory unit;
scheduling, by the programmable memory access processor, a transfer time for a transfer of the operand data from the memory unit to the reconfigurable computing device for the processing operation in accordance with the preset configuration time;
transferring, by the programmable memory access processor, the configuration data from the memory unit to the reconfigurable computing device; and
transferring, by the programmable memory access processor, the operand data from the memory unit to the reconfigurable computing device at the transfer time.

18. A computer implemented method according to claim 17, the method comprising: mapping, by the access processor, the configuration data and/or the operand data over multiple banks of the memory unit.

19. A computer implemented method according to claim 17, the method comprising: controlling, by the access processor, the memory access bandwidth assigned to the configuration data and the operand data according to a predefined scheme.

20. A computer program product for operating a programmable memory access processor of a computing system, the computing system comprising at least one reconfigurable computing device with a plurality of reconfigurable partitions, a memory unit and the programmable memory access processor, the computer program product comprising a computer readable storage medium having program instructions embodied therewith, the program instructions executable by the access processor to cause the access processor to perform a method comprising:
  receiving a preset configuration time for configuring one or more of the partitions for a processing operation, the preset configuration time is an amount of time that is required for configuring the one or more of the partitions for the processing operation;
    performing address generation, address mapping and access scheduling according to the program instructions for:
    retrieving, from the memory unit, configuration data to configure the partitions of the reconfigurable computing device;
    retrieving, from the memory unit, operand data to be processed by the configured partitions; and
    storing processing results of the operand data in the memory unit;
  scheduling a transfer time for a transfer of the operand data from the memory unit to the reconfigurable computing device for the processing operation in accordance with the preset configuration time;
  transferring the configuration data from the memory unit to the reconfigurable computing device; and
  transferring the operand data from the memory unit to the reconfigurable computing device at the transfer time.

* * * * *